(12) United States Patent
Kawakami et al.

(10) Patent No.: US 11,203,670 B2
(45) Date of Patent: Dec. 21, 2021

(54) BISSILYLAMINO GROUP-CONTAINING ORGANIC POLYSILAZANE COMPOUND, METHOD FOR PRODUCING SAME, AND COMPOSITION CONTAINING SAME AND CURED PRODUCT

(71) Applicant: Shin-Etsu Chemical Co., Ltd., Tokyo (JP)

(72) Inventors: Masato Kawakami, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 68 days.

(21) Appl. No.: 16/850,428

(22) Filed: Apr. 16, 2020

(65) Prior Publication Data

US 2020/0332070 A1  Oct. 22, 2020

(30) Foreign Application Priority Data

Apr. 17, 2019  (JP) .............................. JP2019-078714

(51) Int. Cl.
| | | |
|---|---|---|
| *C09D 183/16* | (2006.01) | |
| *C08G 77/62* | (2006.01) | |
| *C08G 77/06* | (2006.01) | |
| *C08L 83/16* | (2006.01) | |

(52) U.S. Cl.
CPC .............. *C08G 77/62* (2013.01); *C08G 77/06* (2013.01); *C08L 83/16* (2013.01); *C09D 183/16* (2013.01)

(58) Field of Classification Search
CPC ........ C08G 77/62; C08L 83/16; C09D 183/16
See application file for complete search history.

(56) References Cited

U.S. PATENT DOCUMENTS

| | | | |
|---|---|---|---|
| 6,329,487 B1 | 12/2001 | Abel et al. | |
| 6,652,978 B2 | 11/2003 | Lukacs, III et al. | |
| 7,202,375 B2 * | 4/2007 | Tonomura ................. | C07F 7/12 556/425 |

FOREIGN PATENT DOCUMENTS

| | | |
|---|---|---|
| EP | 1 481 980 A1 | 12/2004 |
| JP | 2003-514822 A | 4/2003 |
| JP | 2004-532318 A | 10/2004 |

OTHER PUBLICATIONS

Extended European Search Report dated Sep. 28, 2020, in European Patent Application No. 20168737.3.

* cited by examiner

*Primary Examiner* — Marc S Zimmer
(74) *Attorney, Agent, or Firm* — Birch, Stewart, Kolasch & Birch, LLP

(57) ABSTRACT

A bissilylamino group-containing organic polysilazane compound having an average composition represented by general formula (1) below:

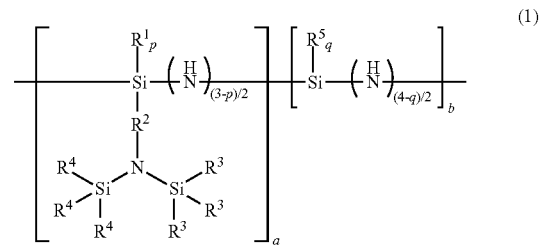

wherein $R^1$ is a monovalent hydrocarbon group, $R^2$ is a divalent hydrocarbon group, $R^3$ and $R^4$ are a monovalent hydrocarbon group, $R^3$ and $R^4$ optionally bond each other to form a ring structure together with a silicon atom to which $R^3$ and $R^4$ are bonded and a nitrogen atom to which the silicon atom is directly bonded, $R^5$ is a monovalent hydrocarbon group, p is 0 or 1, q is 0, 1, or 2, and a and b are numbers which satisfy $0<a\leq 1$, $0\leq b<1$, and $a+b=1$,
and having a number average molecular weight in terms of polystyrene measured by GPC of 500 to 100,000.

8 Claims, 2 Drawing Sheets

BISSILYLAMINO GROUP-CONTAINING ORGANIC POLYSILAZANE COMPOUND, METHOD FOR PRODUCING SAME, AND COMPOSITION CONTAINING SAME AND CURED PRODUCT

CROSS-REFERENCE TO RELATED APPLICATION

This non-provisional application claims priority under 35 U.S.C. § 119(a) on Patent Application No. 2019-078714 filed in Japan on Apr. 17, 2019, the entire contents of which are hereby incorporated by reference.

TECHNICAL FIELD

The present invention relates to a bissilylamino group-containing organic polysilazane compound, a method for producing the same, and a composition containing the same and a cured product.

BACKGROUND ART

Polysilazane compounds are classified into inorganic polysilazane compounds and organic polysilazane compounds. Inorganic polysilazane compounds are obtained from dichlorosilane ($H_2SiCl_2$), whereas organic polysilazane compounds are obtained by ammonolysis polymerization of chlorosilane compounds having organic substituents.

Organic polysilazane compounds are a group of compounds to which various properties can be imparted by changing organic substituents. Representative examples of such organic polysilazane compounds include those obtained by ammonolysis polymerization of dimethyldichlorosilane or methyldichlorosilane (Patent Document 1).

An organic polysilazane compound having an alkoxysilyl group in the molecule has also been developed by reacting the polysilazane described in Patent Document 1 with a silane coupling agent having a primary or secondary amino group (Patent Document 2).

Inorganic polysilazanes, which are commonly known polysilazanes, react quickly with oxygen and moisture in the air and are cured by conversion of Si—N bonds and Si—H groups into Si—O—Si bonds. Inorganic polysilazanes have no organic substituent, and the resulting coating is glass-like and exhibits hydrophilicity.

Although the polysilazane described in Patent Document 1 reacts with moisture in the air and is led to siloxane (Si—O—Si) in the same manner as in inorganic polysilazanes, the polysilazane has a methyl group in the molecule and thus the cured coating exhibits water repellency.

Water repellency is one of the capabilities which are strongly required in fields such as car coating and exterior wall paint. On the raw material surface subjected to water-repellent coating-forming treatment, the attached water droplets flow down due to a small action such as air convection and the gradient of the raw material surface, and thus the water droplets can be easily removed from the row material surface. In the field of exterior wall paint, by covering the exterior wall surface with a water-repellent coating, entering of water into the inside can be prevented and the durability of buildings and the like can be increased.

Generally speaking, coating-forming treatment agents are classified into a one-pack type and a two-pack type. One-pack type can be used without mixing it with other components and is excellent in storage stability. On the other hand, the two-pack type needs to mix the materials just before performing covering. Once the materials are mixed, the materials react so that curing proceeds. So, the two-pack type cannot be stored in an uncured state after mixing.

From the viewpoint of work efficiency, it is important that coating of water-repellent coating-forming treatment agents be cured in a short time. Thus, a water-repellent coating-forming treatment agent that is one-pack type and is capable of forming coating excellent in storage in a short time is strongly required.

CITATION LIST

Patent Document 1: JP-W 2003-514822
Patent Document 2: JP-W 2004-532318

DISCLOSURE OF INVENTION

Although inorganic polysilazanes are capable of forming a cured coating quickly, the resulting coating exhibits hydrophilicity, and thus the water repellency is insufficient.

In contrast, the organic polysilazanes described in Patent Documents 1 and 2 have a methyl group as the organic substituent, and thus have poor water-repellent effect. A compound having a functional group which reacts with an amino group may be cured quickly, thus the compound cannot be used as a one-pack type composition because the reaction proceeds.

If an alkyl group such as a propyl group, which is longer than a methyl group, is introduced as an organic substituent of the organic polysilazane, a cured coating which exhibits higher water repellency can be obtained. However, because polysilazanes form a cured coating by being hydrolyzed, they become less likely to react with water by introduction of a long alkyl group, and need longer time to form a cured coating. Thus, compatibility between short time formation of a cured coating and high water repellency has been a difficult problem.

An object of the invention is to provide a bissilylamino group-containing organic polysilazane compound which quickly reacts with moisture in the air to form a cured coating which has high water repellency, a method for producing the same, and a composition containing the same and a cured product.

The inventors of the present invention have found that a bissilylamino group-containing organic polysilazane compound of which amino groups are protected can be stored stably as a one-pack type composition even if the compound is mixed with a compound having a functional group which reacts with a free amino group, and further the composition provides a cured coating quickly, and the cured coating has high water repellency.

Accordingly, the present invention provides

[1] A bissilylamino group-containing organic polysilazane compound having an average composition represented by general formula (1) below:

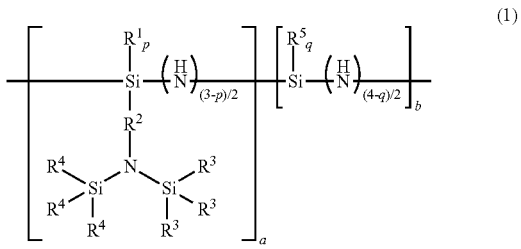

wherein $R^1$ is each independently a monovalent hydrocarbon group having 1 to 10 carbon atoms, $R^2$ is each independently a divalent hydrocarbon group having 1 to 20 carbon atoms optionally containing a heteroatom of O, S, or Si, $R^3$ and $R^4$ are each independently a monovalent hydrocarbon group having 1 to 10 carbon atoms, $R^3$ and $R^4$ optionally bond each other to form a ring structure together with a silicon atom to which $R^3$ and $R^4$ are bonded and a nitrogen atom to which the silicon atom is directly bonded, $R^5$ is each independently a substituted or unsubstituted monovalent hydrocarbon group having 1 to 50 carbon atoms optionally containing a heteroatom of O or S, p is 0 or 1, q is 0, 1, or 2, and a and b are numbers which satisfy $0<a\le1$, $0\le b<1$, and $a+b=1$, and having a number average molecular weight in terms of polystyrene measured by gel permeation chromatography of 500 to 100,000,

[2] A method for producing the bissilylamino group-containing organic polysilazane compound according to [1], including the step of:

mixing a chlorosilane compound having a bissilylamino group represented by general formula (2) below:

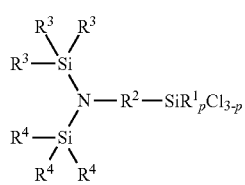

(2)

wherein $R^1$ to $R^4$ and p have the same meaning as above, and a chlorosilane compound represented by general formula (3) below as needed:

(3)

wherein $R^5$ and q have the same meaning as above, and conducting an ammonolysis polymerization,

[3] The method for producing a bissilylamino group-containing organic polysilazane compound according to [2], further including the step of:

adding an aqueous alkali solution for liquid separation after the ammonolysis polymerization,

[4] A composition including the bissilylamino group-containing organic polysilazane compound according to [1] and a solvent,

[5] The composition according to [4], further including a dicarboxylic anhydride represented by general formula (4) below, or a siloxane-containing dicarboxylic anhydride represented by general formula (5) below:

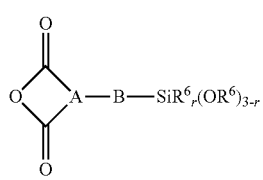

(4)

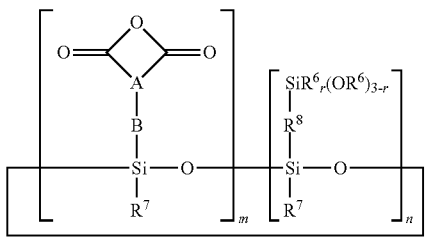

(5)

wherein A is a trivalent hydrocarbon group having 2 to 10 carbon atoms, B is a single bond or a divalent hydrocarbon group having 1 to 10 carbon atoms optionally containing a heteroatom of N, O, or S, $R^6$ is each independently a monovalent hydrocarbon group having 1 to 10 carbon atoms, $R^7$ is each independently a monovalent hydrocarbon group having 1 to 10 carbon atoms, $R^8$ is each independently a divalent hydrocarbon group having 1 to 20 carbon atoms, or a siloxane-containing group represented by general formula (6) below:

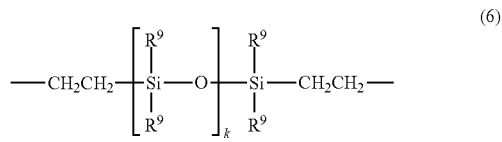

(6)

wherein $R^9$ is each independently a monovalent hydrocarbon group having 1 to 10 carbon atoms, and k is an integer of 1 to 10, r is 0, 1, or 2, and m and n are integers which satisfy $m\le1$, $n\le1$, and $3\le m+n\le8$,

[6] The composition according to [4] or [5], further including at least one metal compound selected from the group consisting of a titanium compound, an aluminum compound, a zinc compound, and a tin compound,

[7] A cured product of the composition according to [5] or [6].

ADVANTAGEOUS EFFECTS OF THE INVENTION

The bissilylamino group-containing organic polysilazane compound obtained in the present invention has amino groups capable of reacting with various functional groups with the amine groups being protected in the molecule, and thus the compound can be used to produce a one-pack type composition even with a compound which usually reacts with an amino group. The composition including the polysilazane compound can be stably stored by a normal storage method. Further, by adding an acid anhydride to the composition, the composition reacts with moisture in the air to form a coating quickly, and in addition, a coating which exhibits high water repellency derived from the organic substituent is obtained.

DESCRIPTION OF THE PREFERRED EMBODIMENTS

Figure 1:
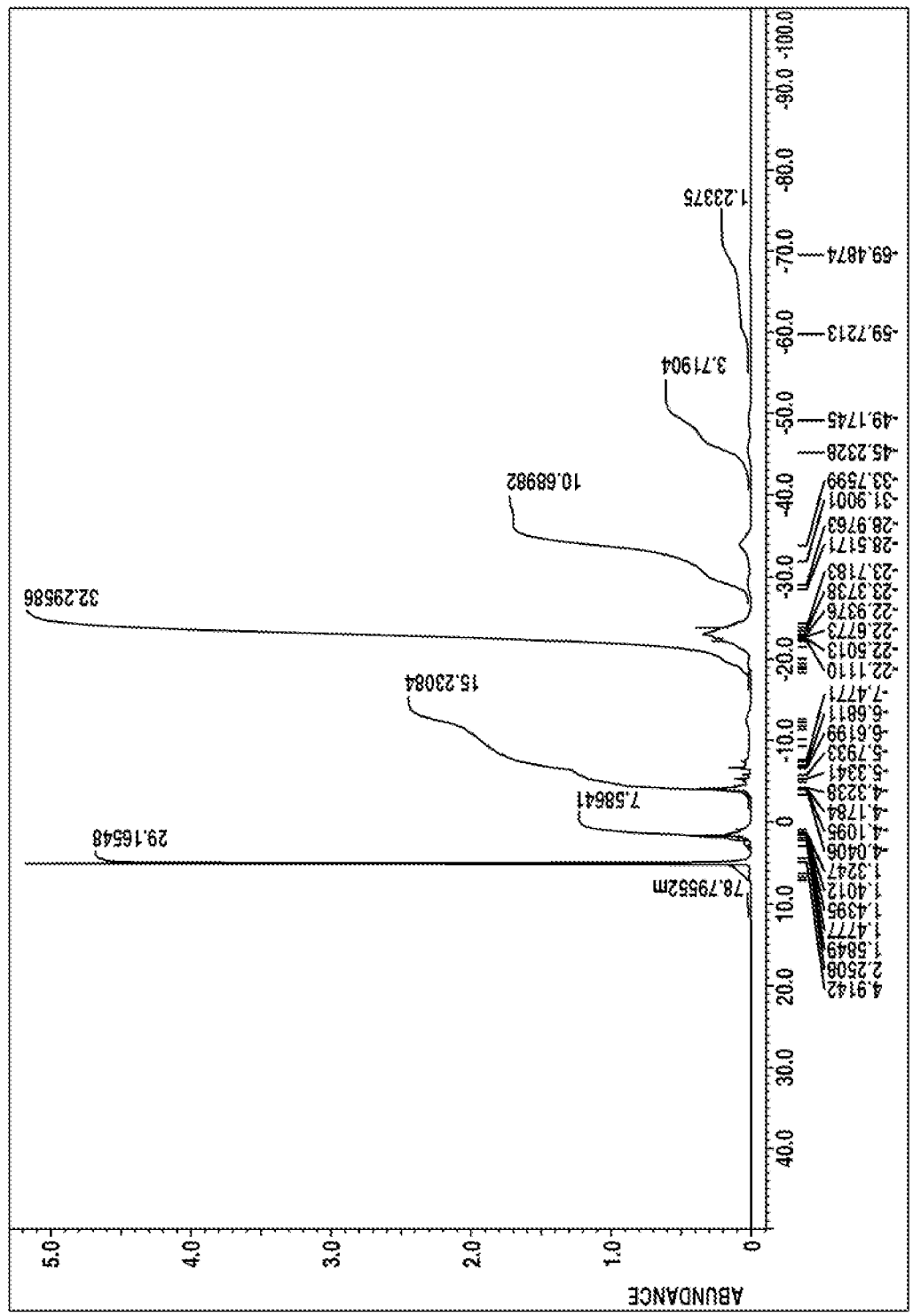
FIG. 1 is a $^{29}$Si-NMR spectrum of the composition obtained in Example 1-3.

Hereinafter, the present invention is specifically described.

[Polysilazane Compound]

The bissilylamino group-containing organic polysilazane compound has an average composition represented by general formula (1) below.

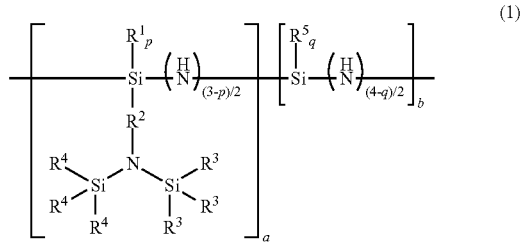

In the general formula (1), $R^1$ is each independently a monovalent hydrocarbon group having 1 to 10 carbon atoms, preferably 1 to 5 carbon atoms. Specific examples of the monovalent hydrocarbon group of $R^1$ include linear alkyl groups such as methyl group, ethyl group, n-propyl group, n-butyl group, n-pentyl group, n-hexyl group, n-heptyl group, n-octyl group, and n-decyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as vinyl group, allyl group, propenyl group, butenyl group, and pentenyl group; aryl groups such as phenyl group and tolyl group; and aralkyl groups such as benzyl group and phenethyl group.

In the general formula (1), $R^1$ represents each independently a divalent hydrocarbon group having 1 to 20 carbon atoms, preferably 1 to 10 carbon atoms, more preferably 1 to 5 carbon atoms optionally containing a heteroatom of O, S, or Si.

Specific examples of the divalent hydrocarbon group of $R^1$ include linear alkylene groups such as methylene group, ethylene group, trimethylene group, tetramethylene group, hexamethylene group, octamethylene group, and decamethylene group; branched alkylene groups such as propylene (methylethylene) group and methyltrimethylene group; cyclic alkylene groups such as cyclohexylene group; alkenylene groups such as propenylene group, 1-butenylene group, and 2-butenylene group; arylene groups such as phenylene group and naphthalenediyl group; and aralkylene groups such as methylenephenylene group and methylenephenylenemethylene group.

Specific examples of the divalent hydrocarbon group which contains a heteroatom of O, S, or Si of $R^1$ include oxyalkylene group, alkyleneoxyalkylene group, thioalkylene group, alkyl enethioalkylene group, dialkylsilylalkylene group, and alkylenedialkylsilylalkylene group, and examples of these alkylene groups independently each other include the same substituents as the groups exemplified above for the linear, branched, and cyclic alkylene groups having 1 to 20 carbon atoms.

In the general formula (1), $R^3$ and $R^4$ each independently represents a monovalent hydrocarbon group having 1 to 10 carbon atoms, preferably 1 to 5 carbon atoms, and $R^3$ and $R^4$ optionally bond each other to form a ring structure together with a silicon atom to which $R^3$ and $R^4$ are bonded and a nitrogen atom to which the silicon atom is directly bonded. Specific examples of the monovalent hydrocarbon group of $R^3$ and $R^4$ include linear alkyl groups such as methyl group, ethyl group, n-propyl group, n-butyl group, n-pentyl group, n-hexyl group, n-heptyl group, n-octyl group, and n-decyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as allyl group, propenyl group, butenyl group, and pentenyl group; aryl groups such as phenyl group and tolyl group; and aralkyl groups such as benzyl group and phenethyl group. In the case of forming a ring structure, examples of the structure include the structures shown in Table 1. A broken line indicates a bonding arm (the same applies hereinafter).

TABLE 1

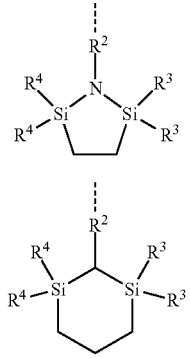

In the general formula (1), $R^5$ represents each independently a substituted or unsubstituted monovalent hydrocarbon group having 1 to 50 carbon atoms, preferably 1 to 20 carbon atoms, more preferably 1 to 10 carbon atoms optionally containing a heteroatom of O or S. Specific examples of the monovalent hydrocarbon group of $R^5$ include linear alkyl groups such as methyl group, ethyl group, n-propyl group, n-butyl group, n-pentyl group, n-hexyl group, n-heptyl group, n-octyl group, n-decyl group, n-dodecyl group, n-tetradecyl group, n-hexadecyl group, n-octadecyl group, n-icol group, n-triacontyl group, n-tetracontyl group, and n-pentacontyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as allyl group, propenyl group, butenyl group, and pentenyl group; aryl groups such as phenyl group and tolyl group; and aralkyl groups such as benzyl group and phenethyl group.

Specific examples of the monovalent hydrocarbon group which contains a heteroatom selected from O and S of $R^5$ include oxyalkyl group, alkyleneoxyalkyl group, thioalkyl group, and alkylenethioalkyl group, and examples of these alkyl groups each independently include the same substituents as groups exemplified above in linear, branched, and cyclic alkylene groups having 1 to 50 carbon atoms.

A part or all of the hydrogen atoms of the monovalent hydrocarbon group of $R^5$ can be substituted with other substituents. Specific examples of these substituents include fluorine atom; aryl groups having 6 to 9 carbon atoms such as phenyl group and tolyl group; aralkyl groups having 7 to 9 carbon atoms such as benzyl group and phenethyl group;

and trialkylsilyl groups, trialkoxysilyl groups, dialkylmonoalkoxysilyl groups, and monoalkyldialkoxysilyl groups in which each alkyl group and each alkoxy group have 1 to 3 carbon atoms, and siloxanyl groups represented by general formula (7) below.

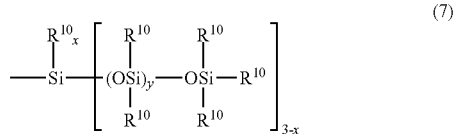

(7)

In general formula (7), each $R^m$ independently represents a substituted or unsubstituted monovalent hydrocarbon group having 1 to 10 carbon atoms, preferably 1 to 6 carbon atoms, and a part or all of the hydrogen atoms in the monovalent hydrocarbon groups can be substituted with a fluorine atom.

Examples of the monovalent hydrocarbon group of $R^{10}$ include linear alkyl groups such as methyl group, ethyl group, n-propyl group, n-butyl group, n-pentyl group, n-hexyl group, n-heptyl group, n-octyl group, and decyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as allyl group, propenyl group, butenyl group, and pentenyl group; aryl groups such as phenyl group and tolyl group; and aralkyl groups such as benzyl group and phenethyl group.

x represents an integer of 0, 1, or 2, and if x is 0 or 1, $-OSiR^{10}{}_3$ groups can be desiloxane-condensed to form a cyclic siloxane.

y represents an integer of 0 to 20, preferably 0 to 15, more preferably 0 to 8.

In the general formula (7), the combination of $R^{-10}$, x, and y is arbitrary and is not particularly limited.

Specific examples of the siloxanyl group represented by general formula (7) which is defined by such $R^{10}$, x, and y include polyalkylpolysiloxanyl groups such as 1,1,1,3,3-pentamethyldisiloxanyl group, 1,1,1,3,3,5,5-heptamethyltrisiloxanyl group, and 1,1,1,3,3,5,5,7,7-nonamethyltetrasiloxanyl group; polyalkylcyclopolysiloxanyl groups such as 1,1,3,3,5-pentamethylcyclotrisiloxanyl group, 1,1,3,3,5,5,7-heptamethylcyclotetrasiloxanyl group, and 1,1,3,3,5,5,7,7,9-nonamethylcyclopentasiloxanyl group; polyphenylpolysiloxanyl groups such as 3,5-diphenyl-1,1,1,3,5-pentamethyltrisiloxanyl group, 1,1,1,3,5,7-hexamethyl-3,5,7-triphenyltetrasiloxanyl group, 1,1,1,3,5,7,9-heptamethyl-3,5,7,9-tetraphenylpentasiloxanyl group, 3,3,5,5-tetraphenyl-1,1,1-trimethyltrisiloxanyl group, 3,3,5,5,7,7-hexaphenyl-1,1,1-trimethyltetrasiloxanyl group, and 3,3,5,5,7,7,9,9-octaphenyl-1,1,1-trimethylpentacyloxanyl group.

In the general formula (1), p represents 0 or 1, and q represents 0, 1, or 2. a and b are numbers which satisfy $0<a\leq 1$, $0\leq b<1$, and $a+b=1$.

The number average molecular weight in terms of polystyrene measured by GPC of the bissilylamino group-containing organic polysilazane compound is 500 to 100,000, preferably 500 to 10,000, more preferably 800 to 5,000. GPC conditions are as described in the section of Examples.

[Method for Production]

A method for producing the bissilylamino group-containing organic polysilazane compound is described.

The bissilylamino group-containing organic polysilazane compound can be obtained, for example, by subjecting a chlorosilane compound having a bissilylamino group represented by general formula (2) below alone to ammonolysis polymerization, or by mixing a chlorosilane compound having a bissilylamino group represented by general formula (2) below and a chlorosilane compound represented by general formula (3) below and subjecting the mixture to ammonolysis polymerization.

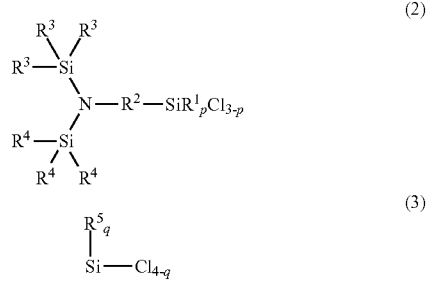

$R^1$ to $R^4$ and p in general formula (2) have the same meaning as above.

Specific examples of the chlorosilane compound having a bissilylamino group represented by the general formula (2) include: trichlorosilane compounds such as bis(trimethylsilyl)aminopropyltrichlorosilane, bis(trimethylsilyl)aminohexyltrichlorosilane, bis(trimethylsilyl)aminooctyltrichlorosilane, bis(triethylsilyl)aminopropyltrichlorosilane, bis(triethylsilyl)aminohexyltrichlorosilane, bis(triethylsilyl)aminooctyltrichlorosilane, bis(tert-butyldimethylsilyl)aminopropyltrichlorosilane, bis(tert-butyldimethylsilyl)aminohexyltrichlorosilane, bis(tert-butyldimethylsilyl)aminooctyltrichlorosilane, bis(triisopropylsilyl)aminopropyltrichlorosilane, bis(triisopropylsilyl)aminohexyltrichlorosilane, bis(triisopropylsilyl)aminooctyltrichlorosilane, bis(tert-butyldiphenylsilyl)aminopropyltrichlorosilane, bis(tert-butyldiphenylsilyl)aminohexyltrichlorosilane, bis(tert-butyldiphenylsilyl)aminooctyltrichlorosilane, bis(dimethylvinylsilyl)aminopropyltrichlorosilane, bis(dimethylvinylsilyl)aminohexyltrichlorosilane, bis(dimethylvinylsilyl)aminooctyltrichlorosilane, bis(trimethylsilyl)aminopropyltrichlorosilylpropyl ether, bis(trimethylsilyl)aminopropyltrichlorosilylpropyl sulfide, bis(triethylsilyl)aminopropyltrichlorosilylpropyl ether, bis(triethylsilyl)aminopropyltrichlorosilylpropyl sulfide, bis(tert-butyldimethylsilyl)aminopropyltrichlorosilylpropyl ether, bis(tert-butyldimethylsilyl)aminopropyltrichlorosilylpropyl sulfide, bis(triisopropylsilyl)aminopropyltrichlorosilylpropyl ether, bis(triisopropylsilyl)aminopropyltrichlorosilylpropyl sulfide, bis(tert-butyldiphenylsilyl)aminopropyltrichlorosilylpropyl ether, bis(tert-butyldiphenylsilyl)aminopropyltrichlorosilylpropyl sulfide, bis(dimethylvinylsilyl)aminopropyltrichlorosilylpropyl ether, bis(dimethylvinylsilyl)aminopropyltrichlorosilylpropyl sulfide, 1-bis(trimethylsilyl)aminopropyl-3-trichlorosilylpropyl 1,1,3,3-tetramethyldisiloxane, 1-bis(triethylsilyl)aminopropyl-3-trichlorosilylpropyl-1,1,3,3-tetramethyldisiloxane, 1-bis(tert-butyldimethylsilyl)aminopropyl-3-trichlorosilylpropyl-1,1,3,3-tetramethyldisiloxane, 1-bis(triisopropylsilyl)aminopropyl-3-trichlorosilylpropyl-1,1,3,3-tetramethyldisiloxane, 1-bis(tert-butyldiphenylsilyl)aminopropyl-3-trichlorosilylpropyl-1,1,3,3-tetramethyldisiloxane, and 1-bis (dimethylvinylsilyl)aminopropyl-3-trichlorosilylpropyl-1,1,3,3-tetramethyldisiloxane; dichlorosilane compounds such as bis(trimethylsilyl)aminopropylmethyldichlorosilane, bis(trimethylsilyl)aminohexylmethyldichlorosilane, bis(trimethylsilyl)aminooctylmethyldichlorosilane, bis(triethylsilyl)aminopropylmethyldichlorosilane, bis(triethylsilyl)aminohexylmethyldichlorosilane, bis(triethylsilyl)aminooctylmethyldichlorosilane, bis(tert-butyldimethylsilyl)aminopropylmethyldichlorosilane, bis(tert-butyldimethylsilyl)aminohexylmethyldichlorosilane, bis(tert-butyldimethylsilyl)aminooctylmethyldichlorosilane, bis(triisopropylsilyl)aminopropylmethyldichlorosilane, bis(triisopropylsilyl)aminohexylmethyldichlorosilane, bis(triisopropylsilyl)aminooctylmethyldichlorosilane, bis(tert-butyldiphenylsilyl)aminopropylmethyldichlorosilane, bis(tert-butyldiphenylsilyl)aminohexylmethyldichlorosilane, bis(tert-butyldiphenylsilyl)aminooctylmethyldichlorosilane, bis(dimethylvinylsilyl)aminopropylmethyldichlorosilane, bis(dimethylvinylsilyl)aminohexylmethyldichlorosilane, bis(dimethylvinylsilyl)aminooctylmethyldichlorosilane, bis(trimethylsilyl)aminopropylmethyldichlorosilylpropyl ether, bis(trimethylsilyl)aminopropylmethyldichlorosilylpropyl sulfide, bis(triethylsilyl)aminopropylmethyldichlorosilylpropyl ether, bis(triethylsilyl)aminopropylmethyldichlorosilylpropyl sulfide, bis(tert-butyldimethylsilyl)aminopropylmethyldichlorosilylpropyl ether, bis(tert-butyldimethylsilyl)aminopropylmethyldichlorosilylpropyl sulfide, bis(triisopropylsilyl)aminopropylmethyldichlorosilylpropyl ether, bis(triisopropylsilyl)aminopropylmethyldichlorosilylpropyl sulfide, bis(tert-butyldiphenylsilyl)aminopropylmethyldichlorosilylpropyl ether, bis(tert-butyldiphenylsilyl)aminopropylmethyldichlorosilylpropyl sulfide, bis(dimethylvinylsilyl)aminopropylmethyldichlorosilylpropyl ether, bis(dimethylvinylsilyl)aminopropylmethyldichlorosilylpropyl sulfide, 1-bis(trimethylsilyl)aminopropyl-3-methyldichlorosilylpropyl-1,1,3,3-tetramethyldisiloxane, 1-bis(triethylsilyl)aminopropyl-3-methyldichlorosilylpropyl-1,1,3,3-tetramethyldisiloxane, 1-bis(tert-butyldimethylsilyl)aminopropyl-3-methyldichlorosilylpropyl-1,1,3,3-tetramethyldisiloxane, 1-bis(triisopropylsilyl)aminopropyl-3-methyldichlorosilylpropyl-1,1,3,3-tetramethyldisiloxane, 1-bis(tert-butyldiphenylsilyl)aminopropyl-3-methyldichlorosilylpropyl-1,1,3,3-tetramethyldisiloxane, and 1-bis(dimethylvinylsilyl)aminopropyl-3-methyldichlorosilylpropyl-1,1,3,3-tetramethyldisiloxane.

$R^5$ and q in general formula (3) have the same meaning as above.

Specific examples of the chlorosilane compound represented by general formula (3) include tetrachlorosilane; trichlorosilane compounds such as methyltrichlorosilane, ethyltrichlorosilane, propyltrichlorosilane, hexyltrichlorosilane, cyclohexyltrichlorosilane, octyltrichlorosilane, decyltrichlorosilane, dodecyltrichlorosilane, hexadecyltrichlorosilane, octadecyltrichlorosilane, isobutyltrichlorosilane, 2-methylpentyltrichlorosilane, 2-ethylhexyltrichlorosilane, 2-propenyltrichlorosilane, phenyltrichlorosilane, benzyltrichlorosilane, phenethyltrichlorosilane, phenylbutyltrichlorosilane, phenyloctyltrichlorosilane, 1,4-vinylphenyltrichlorosilane, 1,2-trimethylsiloxyphenylpropyltrichlorosilane, trichlorosilylpropyl methyl ether, trichlorosilylpropyl methyl sulfide, trichlorosilylpropyl phenyl ether, trichlorosilylpropyl phenyl sulfide, 1-tris(trimethylsiloxy)silyl-2-trichlorosilylethane, 1-tris(trimethylsiloxy)silyl-6-trichlorosilylhexane, 1-tris(trimethylsiloxy)silyl-8-trichlorosilyloctane, bis(1,1,1,3,3-pentamethyldisiloxy)methylsilyltrichlorosilane, 1-bis(trimethylsiloxy)methylsilyl-2-trichlorosilylethane, 1-bis(trimethylsiloxy)methylsilyl-6-trichlorosilylhexane, 1-bis(trimethylsiloxy)methylsilyl-8-trichlorosilyloctane, 1-trimethylsiloxydimethylsilyl-2-trichlorosilylethane, 1-trimethylsiloxydimethylsilyl-6-trichlorosilylhexane, 1-trimethylsiloxydimethylsilyl-2-trichlorosilyloctane, 1-trimethylsiloxydimethylsilyl-2-trichlorosilyloctane, 1,1,3,3,5,5,7-heptamethyl-7-trichlorosilylethylcyclotetrasiloxane, 1-(1,1,1,3,3,5,5,7,7,9,9-undecamethylpentasiloxy)dimethylsilyl-2-trichlorosilylethane, 1-(1,1,1,3,3,5,5,7,7,9,9,11,11,13,13,15,15,17,17,19,19-henicosamethyldecasiloxy)-dimethylsilyl-2-trichlorosilylethane, 1-(1,1,1,3,3,5,5,7,7,9,9-undecamethylpentasiloxy)dimethylsilyl-6-trichlorosilylhexane, 1-(1,1,1,3,3,5,5,7,7,9,9,11,11,13,13,15,15,17,17,19,19-henicosamethyldecasiloxy)-dimethylsilyl-6-trichlorosilylhexane, 1-(1,1,1,3,3,5,5,7,7,9,9-undecamethylpentasiloxy)dimethylsilyl-8-trichlorosilyloctane, 1-(1,1,1,3,3,5,5,7,7,9,9,11,11,13,13,15,15,17,17,19,19-henicosamethyldecasiloxy)-dimethylsilyl-8-trichlorosilyloctane, (3,3,3)-trifluoropyrtrichlorosilane, (3,3,4,4,5,5,6,6,6)-nonafluorohexyltrichlorosilane, and (3,3,4,4,5,5,6,6,7,7,8,8,8)tridecafluorooctyltrichlorosilane; and dichlorosilane compounds such as dimethyldichlorosilane, ethylmethyldichlorosilane, propylmethyldichlorosilane, hexylmethyldichlorosilane, cyclohexylmethyldichlorosilane, octylmethyldichlorosilane, decylmethyldichlorosilane, dodecylmethyldichlorosilane, hexadecylmethyldichlorosilane, octadecylmethyldichlorosilane, diethyldichlorosilane, dibutyldichlorosilane, diisopropyldichlorosilane, dicyclopentyldichlorosilane, isobutylmethyldichlorosilane, 2-methylpentylmethyldichlorosilane, 2-ethylhexylmethyldichlorosilane, 2-propenylmethyldichlorosilane, phenylmethyldichlorosilane, benzylmethyldichlorosilane, phenethylmethyldichlorosilane, phenylbutylmethyldichlorosilane, phenyloctylmethyldichlorosilane, 1,4-vinylphenylmethyldichlorosilane, 1,2-(trimethylsiloxy)phenylpropylmethyldichlorosilane, methyldichlorosilylpropylmethyl ether, methyl dichlorosilylpropyl methyl sulfide, methyl dichlorosilylpropyl phenyl ether, methyldichlorosilylpropylphenyl sulfide, 1-tris(trimethylsiloxy)silyl-2-methyldichlorosilylethane, 1-bis(trimethylsiloxy)methylsilyl-2-methyldichlorosilylethane, 1-(trimethylsiloxy)dimethylsilyl-2-trichlorosilylethane, 1,1,3,3,5,5,7-heptamethyl-7-methyldichlorosilylethylcyclotetrasiloxane, 1-(1,1,1,3,3,5,5,7,7,9,9-undecamethylpentasiloxy)dimethylsilyl-2-methyldichlorosilylethane, 1-(1,1,1,3,3,5,5,7,7,9,9,11,11,13,13,15,15,17,17,19,19-henicosamethyldecasiloxy)-dimethylsilyl-2-methyldichlorosilylethane, 1-(1,1,1,3,3,5,5,7,7,9,9-undecamethylpentasiloxy)dimethylsilyl-6-methyldichlorosilylhexane, 1-(1,1,1,3,3,5,5,7,7,9,9,11,11,13,13,15,15,17,17,19,19-henicosamethyldecasiloxy)-dimethylsilyl-6-methyldichlorosilylhexane, 1-(1,1,1,3,3,5,5,7,7,9,9-undecamethylpentasiloxy)dimethylsilyl-8-methyldichlorosilyloctane, 1-(1,1,1,3,3,5,5,7,7,9,9,11,11,13,13,15,15,17,17,19,19-henicosamethyldecasiloxy)-dimethylsilyl-8-methyldichlorosilyloctane, (3,3,3)-trifluoropyrmethyldichlorosilane, (3,3,4,4,5,5,6,6,6)-nonafluorohexylmethyldichlorosilane, and (3,3,4,4,5,5,6,6,7,7,8,8,8)tridecafluorooctylmethyldichlorosilane.

Ammonolysis polymerization is performed by reacting ammonia with a chlorosilane compound having a bissilylamino group represented by general formula (2) or with a mixture of a chlorosilane compound having a bissilylamino group represented by general formula (2) and a chlorosilane compound represented by general formula (3). When the chlorosilane compound having a bissilylamino group represented by general formula (2) and the chlorosilane compound represented by general formula (3) are used in combination, the use ratio thereof is preferably 1/0.5 to 1/10, more preferably 1/1 to 1/7 in molar ratio.

Though ammonolysis polymerization proceeds without a solvent, a solvent is preferably used because ammonium chloride is by-produced as the reaction proceeds, making stirring difficult. Examples of the solvent include hydrocarbon solvents such as pentane, hexane, cyclohexane, isooctane, benzene, toluene, and xylene; ether solvents such as diethyl ether, tetrahydrofuran, 4-methyltetrahydropyran, cyclopentyl methyl ether, dioxane, and dipropylene glycol dimethyl ether; ester solvents such as ethyl acetate, isopropyl acetate, and butyl acetate; and siloxane solvents such as hexamethyldisiloxane, tris(trimethylsiloxy)methylsilane, octamethylcyclotetrasiloxane, and decamethylcyclopentasiloxane, and these solvents can be used alone or in combination of two or more.

Though ammonolysis polymerization proceeds without a catalyst, the reaction time can be shortened by adding a catalyst. Specific examples of the catalyst include Bronsted acids such as methanesulfonic acid, benzenesulfonic acid, dodecylbenzenesulfonic acid, trifluoromethanesulfonic acid, acetic acid, propionic acid, benzoic acid, and trifluoroacetic acid.

Though the addition amount of the catalyst is not particularly limited, it is preferably 0.001 to 0.1 mol, more preferably 0.005 to 0.1 mol per 1 mol of the chlorosilane compound having a bissilylamino group represented by general formula (2) from the viewpoint of the effect or side reaction of addition of the catalyst.

Though the reaction temperature is not particularly limited, it is preferably −78 to 100° C., more preferably −78 to 50° C., and even more preferably −10 to 20° C., from the viewpoint of sublimation of ammonium chloride or the reaction rate.

The reaction time is preferably 30 minutes to 24 hours, more preferably 3 hours to 15 hours, from the viewpoint of reaction rate or side reaction. Further, though the atmosphere in which the reaction is performed is not particularly limited, an atmosphere of inert gases such as nitrogen or argon is preferable to avoid hydrolysis of the raw material.

By-produced ammonium chloride can be removed from the reaction liquid after completion of the reaction, and a bissilylamino group-containing organic polysilazane compound can be recovered. Examples of the removal method include a filtration method and a liquid separation method of dissolving and then separating ammonium chloride using an aqueous alkali solution.

In particular, from the viewpoint of improving the yield, a method of dissolving and separating the salt using an aqueous alkali solution is preferable. Examples of the alkali component used in this case include alkali metal hydroxides such as lithium hydroxide, sodium hydroxide, and potassium hydroxide; and alkali earth metal hydroxides such as calcium hydroxide. The concentration of the aqueous alkali solution is preferably 5 to 52% by weight, more preferably 15 to 52% by weight, and even more preferably 25 to 48% by weight, from the viewpoint of product stability and productivity.

The amount used of the alkali component such as an alkali metal hydroxide is preferably 1 to 2 mol, more preferably 1 to 1.5 mol per 1 mol of the produced ammonium chloride, from the viewpoint of yield or product stability.

[Composition]

A composition including the bissilylamino group-containing organic polysilazane compound and a solvent is described.

Examples of the solvent include solvents same as those can be used for ammonolysis reaction described above. Though the amount used of the solvent is not particularly limited, it is included so that the concentration of the bissilylamino group-containing organic polysilazane compound will be preferably 0.1 to 80% by weight, more preferably 1 to 50% by weight, even more preferably 10 to 50% by weight in the entire composition, from the viewpoint of viscosity or performance.

The composition can include one or more metal compounds. The metal compound means those act as a curing catalyst, and the composition can be quickly cured by adding metal compounds.

Examples of the metal compound include tetraalkyl orthotitanates such as tetrabutyl orthotitanate, tetramethyl orthotitanate, tetraethyl orthotitanate, and tetrapropyl orthotitanate, and titanium compounds such as partially hydrolyzed products thereof; aluminum compounds such as aluminum trihydroxide, aluminum alcoholate, aluminum acylate, aluminum acylate salts, aluminosyloxy compounds, and aluminum metal chelate compounds; tin compounds such as dioctyltin dioctate and dioctyltin dilaurate; and zinc compounds such as zinc octylate and zinc 2-ethylhexanoate.

Though the amount used of the metal compound is not particularly limited, it is preferably 0.01 to 10% by weight, more preferably 0.1 to 5% by weight per the bissilylamino group-containing organic polysilazane compound, from the viewpoint of reaction rate or side reaction.

The composition can include a dicarboxylic anhydride represented by general formula (4) below or a siloxane-containing dicarboxylic anhydride represented by general formula (5). By including these dicarboxylic anhydrides, the composition can be cured quickly.

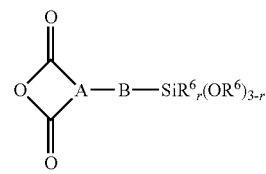
(4)

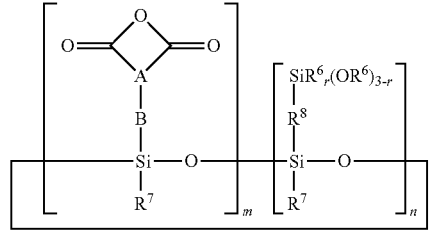
(5)

In general formulas (4) and (5), A represents a trivalent hydrocarbon group having 2 to 10 carbon atoms. Specific examples of the dicarboxylic anhydride containing A include the groups shown in Table 2. In Table, B represents B in general formulas (4) and (5).

TABLE 2

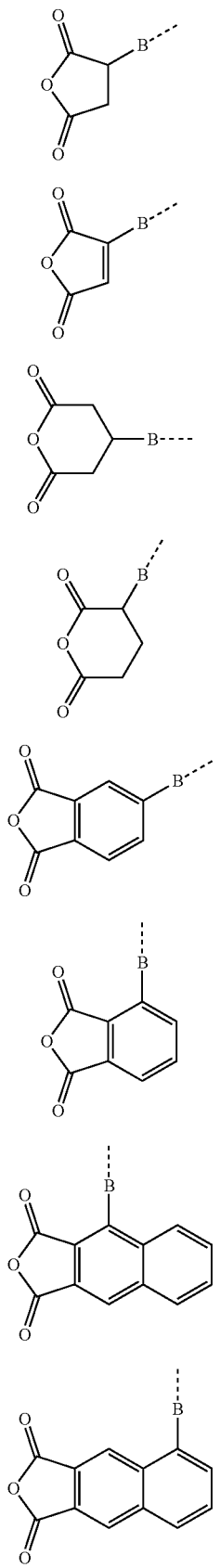

TABLE 2-continued

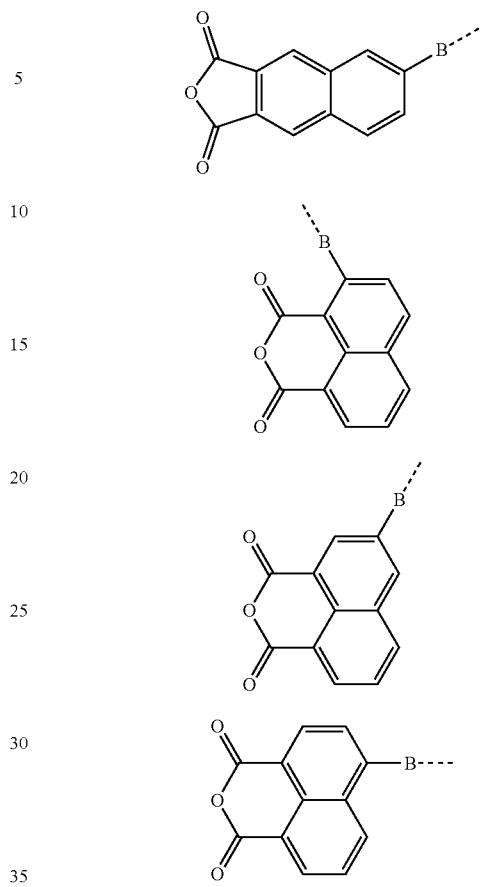

In general formulas (4) and (5), B is a divalent hydrocarbon group having 1 to 10 carbon atoms, preferably 1 to 6 carbon atoms optionally containing a heteroatom of N, O, or S, or a single bond. Examples of the divalent hydrocarbon group of B include linear alkylene groups such as methylene, ethylene, trimethylene, tetramethylene, hexamethylene, octamethylene, and decamethylene groups; branched alkylene groups such as propylene (methylethylene) group and methyltrimethylene group; cyclic alkylene groups such as cyclohexylene group; alkenylene groups such as propenylene group, 1-butenylene group, and 2-butenylene group; arylene groups such as phenylene group and naphthalenediyl group; and aralkylene groups such as methylenephenylene group and methylenephenylenemethylene group.

Examples of the divalent hydrocarbon group which contains one heteroatom of O or S of B include an alkyleneoxyalkylene group and an alkylenethioalkylene group, and examples of the divalent hydrocarbon group which contains two or more heteroatoms of N, O, or S include the substituents shown in Table 3. In Table, A represents A in general formulas (4) and (5).

TABLE 3

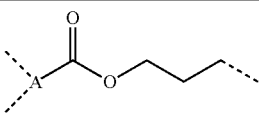

TABLE 3-continued

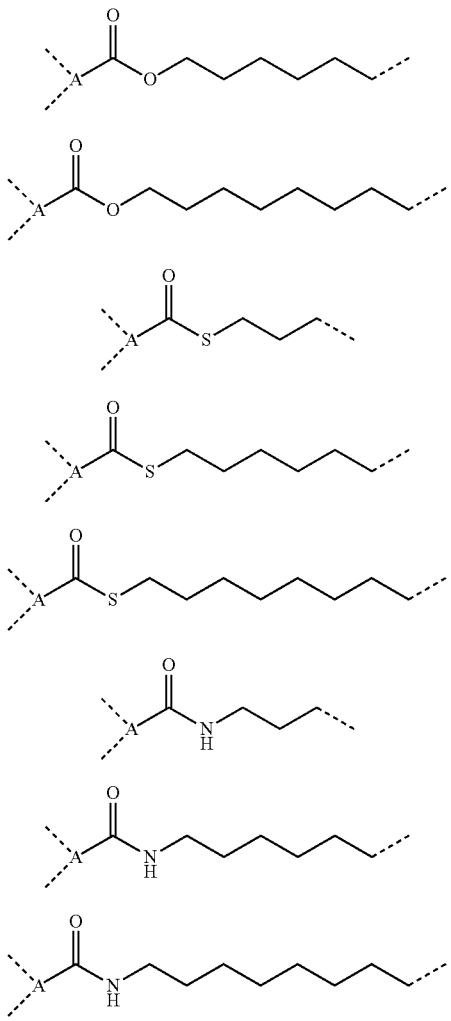

The linear divalent hydrocarbon groups in Table 3 can be each independently those changed to substituents same as branched and cyclic hydrocarbon groups exemplified as the divalent hydrocarbon group of B above.

In general formulas (4) and (5), $R^6$ each independently represents a monovalent hydrocarbon group having 1 to 10 carbon atoms, preferably 1 to 5 carbon atoms. Specific examples of the monovalent hydrocarbon group of $R^6$ include the same substituents as those of $R^1$. In general formulas (4) and (5), r represents 0, 1, or 2.

Specific examples of the dicarboxylic anhydride represented by general formula (4) include succinic anhydride compounds such as trimethoxysilylsuccinic acid, trimethoxysilylpropyl succinic anhydride, dimethoxymethylsilylpropyl succinic anhydride, dimethylmethoxysilylpropyl succinic anhydride, trimethoxysilyloctyl succinic anhydride, dimethoxymethylsilyl octyl succinic anhydride, dimethylmethoxysilyloctyl succinic anhydride, dimethoxyethylsilylpropyl succinic anhydride, dimethoxyethyl octyl succinic anhydride, dimethoxypropylsilylpropyl succinic anhydride, dimethoxypropyl octyl succinic anhydride, isobutyl dimethoxysilylpropyl succinic anhydride, isobutyl dimethoxyoctyl succinic anhydride, dimethoxy tert-butylsilylpropyl succinic anhydride, dimethoxy tert-butyl octyl succinic anhydride, dimethylethoxysilylpropyl succinic anhydride, dimethoxyethoxysilyloctyl succinic anhydride, dimethylpropoxysilylpropyl succinic anhydride, dimethylpropoxysilyloctyl succinic anhydride, isopropoxydimethylsilylpropyl succinic anhydride, isopropoxydimethylsilyloctyl succinic anhydride, butoxydimethylsilylpropyl succinic anhydride, and butoxydimethylsilyloctyl succinic anhydride; maleic anhydride compounds such as trimethoxysilylmaleic acid, trimethoxysilylpropylmaleic anhydride, and trimethoxysilyloctylmaleic anhydride; glutaric anhydride compounds such as trimethoxysilylglutaric acid, trimethoxysilylpropylglutaric anhydride, trimethoxysilyloctylglutaric anhydride, glutaric anhydride propyltrimethoxysilylpropyl thioether; phthalic anhydride compounds such as trimethoxysilylphthalic acid, trimethoxysilylpropylphthalic anhydride, trimethoxysilyloctylphthalic anhydride, N-trimethoxysilylpropyl-1,3-dihydro-1,3-dioxo-5-isobenzofurancarboxamide, N-trimethoxysilylhexyl-1,3-dihydro-1,3-dioxo-5-isobenzofurancarboxamide, 1,3-dihydro-1,3-dioxo-5-isobenzofurancarboxylic acid trimethoxysilylpropyl ester, 1,3-dihydro-1,3-dioxo-5-isobenzofurancarboxylic acid trimethoxysilylhexyl ester, 1,3-dihydro-1,3-dioxo-5-isobenzofurancarboxylic acid trimethoxysilylpropyl thioester, and 1,3-dihydro-1,3-dioxo-5-isobenzofurancarboxylic acid trimethoxysilylhexyl thioester; 2,3-naphthalic anhydride compounds such as 1-trimethoxysilyl 2,3-naphthalic anhydride, 5-trimethoxysilylpropyl-2,3-naphthalic anhydride, 6-trimethoxysilyloctyl-2,3-naphthalic anhydride, and 2,3-naphthalic acid propyltrimethoxysilylpropyl thioether; and 1,8-naphthalic anhydride compounds such as 2-trimethoxysilyl-1,8-naphthalic anhydride, 3-trimethoxysilylpropyl-1,8-naphthalic anhydride, 4-trimethoxysilyloctyl-1,8-naphthalic anhydride, and anhydrous 1,8-naphthalic acid propyltrimethoxysilylpropyl ether.

In general formula (5), $R^7$ is each independently a monovalent hydrocarbon group having 1 to 10 carbon atoms, preferably 1 to 5 carbon atoms. Specific examples of $R^7$ include the same substituents as those of $R^1$.

$R^8$ is each independently a divalent hydrocarbon group having 1 to 20 carbon atoms, preferably 2 to 8 carbon atoms, or a siloxane-containing group represented by general formula (6) below.

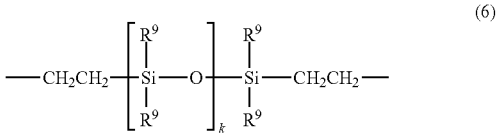

(6)

Specific examples of the divalent hydrocarbon group of $R^8$ in general formula (5) include linear alkylene groups such as methylene group, ethylene group, trimethylene group, tetramethylene group, hexamethylene group, octamethylene group, and decamethylene group; branched alkylene groups such as methyltrimethylene group; alkenylene groups such as propenylene group, 1-butenylene group, and 2-butenylene group; arylene groups such as phenylene group and naphthalenediyl group; and aralkylene groups such as methylenephenylene group and methyl enephenylenemethylene group.

In general formula (6), $R^9$ is each independently a monovalent hydrocarbon group having 1 to 10 carbon atoms, preferably 1 to 5 carbon atoms, and k represents an integer of 1 to 10, preferably 1 to 6. Specific examples of $R^9$ include the same substituents as those of $R^1$. In general formula (6), the combination of $R^9$ and k is arbitrary and is not particularly limited.

Specific examples of the siloxane-containing group represented by the general formula (6) include ethylenepolydimethylsiloxydimethylethylene groups such as ethylenedimethylsiloxydimethylsilylethylene group and ethylenedecaethylpentasiloxydimethylsilylethylene group; ethylenepolydiethylsiloxydiethylethylene group such as ethylenediethylsiloxydiethylsilylethylene group and ethylenedecaethylpentasiloxydiethylsilylethylene group; and ethylenepolydipropylsiloxydipropylethylene group such as ethylenedipropylsiloxydipropylsilylethylene group and ethylenedecapropylpentasiloxydipropylsilylethylene group.

In general formula (5), m and n are integers which satisfy $m \geq 1$, $n \geq 1$, and $3 \leq m+n \leq 8$.

Specific examples of the siloxane-containing dicarboxylic anhydride represented by general formula (5) include, if $R^8$ is a divalent hydrocarbon group, succinic anhydride compounds such as 1-propyl succinic anhydride-3,5,7-tris(trimethoxysilylethyl)-tetramethylcyclotetrasiloxane, 1-propyl succinic anhydride-3,5,7-tris(trimethoxysilyloctyl)-tetramethylcyclotetrasiloxanesiloxane, 1,3-bis(propyl succinic anhydride)-5,7 bis (trimethoxysilyloctyl)tetramethylcyclotetrasiloxane, and 1,5-bis(propyl succinic anhydride)-3,7 bis(trimethoxysilyloctyl)tetramethylcyclotetrasiloxane; maleic anhydride compounds such as 1-propyl maleic anhydride-3,5,7-tris(trimethoxysilylethyl)tetramethylcyclotetrasiloxane, 1-propyl maleic anhydride-3,5,7-tris(trimethoxysilyloctyl)tetramethylcyclotetrasiloxane, 1,3-bis(propyl maleic anhydride)-5,7 bis(trimethoxysilyloctyl)-tetramethylcyclotetrasiloxane, and 1,5-bis(propyl maleic anhydride)-3,7 bis(trimethoxy-silyloctyl)tetramethylcyclotetrasiloxane; glutaric anhydride compounds such as 1-propyl glutaric anhydride-3,5,7-tris(trimethoxysilylethyl)tetramethylcyclotetrasiloxane, 1-propyl glutarate anhydride-3,5,7-tris(trimethoxysilyloctyl) tetramethylcyclotetrasiloxane, 1,3-bis(propyl glutarate anhydride)-5,7 bis(trimethoxysilyloctyl)tetramethylcyclotetrasiloxane, and 1,5-bis(propyl glutarate anhydride)-3,7 bis(trimethoxysilyloctyl)tetramethylcyclotetrasiloxane; phthalic anhydride compounds such as 1-propyl phthalic anhydride-3,5,7-tris(trimethoxysilylethyl)tetramethylcyclotetrasiloxane, 1-propyl phthalic anhydride-3,5,7-tris (trimethoxysilyloctyl)tetramethyl cyclotetrasiloxane, 1,3-bis (propyl phthalic anhydride)-5,7 bis(trimethoxysilyloctyl) tetramethylcyclotetrasiloxane, and 1,5-bis(propyl phthalic anhydride)-3,7 bis(trimethoxysilyloctyl)tetramethylcyclotetrasiloxane; 2,3-naphthalic anhydride compounds such as 1-(2,3-propyl naphthalic anhydride)-3,5,7-tris(trimethoxysilylethyl)tetramethylcyclotetrasiloxane, 1-(2,3-propyl naphthalic anhydride)-3,5,7-tris(trimethoxysilyloctyl)tetramethylcyclotetrasiloxane, 1,3-bis(2,3-propyl naphthalate anhydride)-5,7 bis(trimethoxysilyloctyl)tetramethylcyclotetrasiloxane, and 1,5-bis(2,3-propyl naphthalic anhydride)-3,7 bis(trimethoxysilyloctyl)tetramethylcyclotetrasiloxane; and 1,8-naphthalic anhydride compounds such as 1-(1,8-propyl naphthalic anhydride)-3,5,7-tris(trimethoxysilylethyl)tetramethylcyclotetrasiloxane, 1-(1,8-propyl naphthalic anhydride)-3,5 ,7-tris(trimethoxysilyloctyl) tetramethylcyclotetrasiloxane, 1,3-bis(1,8-propyl naphthalate anhydride)-5,7 bis(trimethoxysilyloctyl)tetramethylcyclotetrasiloxane, and 1,5-bis(1,8-propyl naphthalic anhydride)-3,7 bis(trimethoxysilyloctyl)tetramethylcyclotetrasiloxane.

Specific examples of the siloxane-containing dicarboxylic anhydride in the case where $R^8$ is a siloxane-containing group represented by general formula (6) in general formula (5) are shown in Table 4. In Table, Me represents a methyl group.

TABLE 4

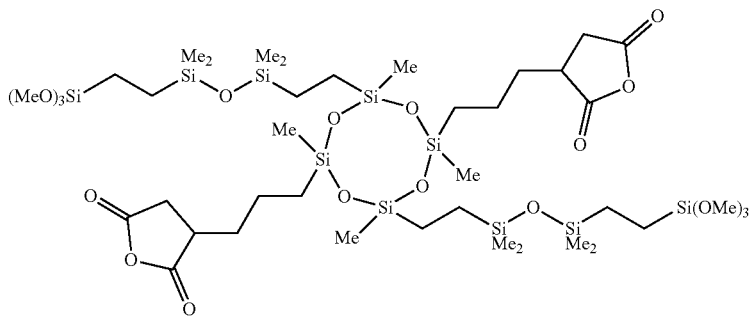

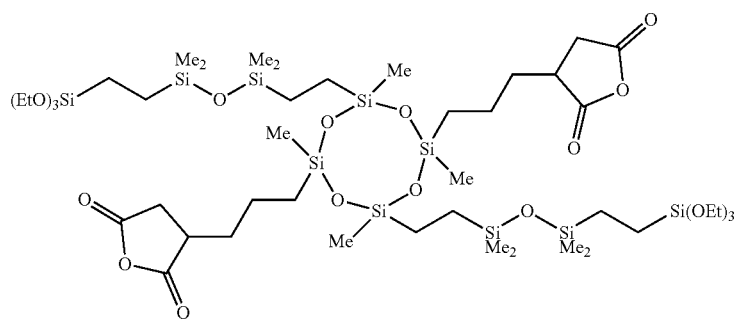

TABLE 4-continued

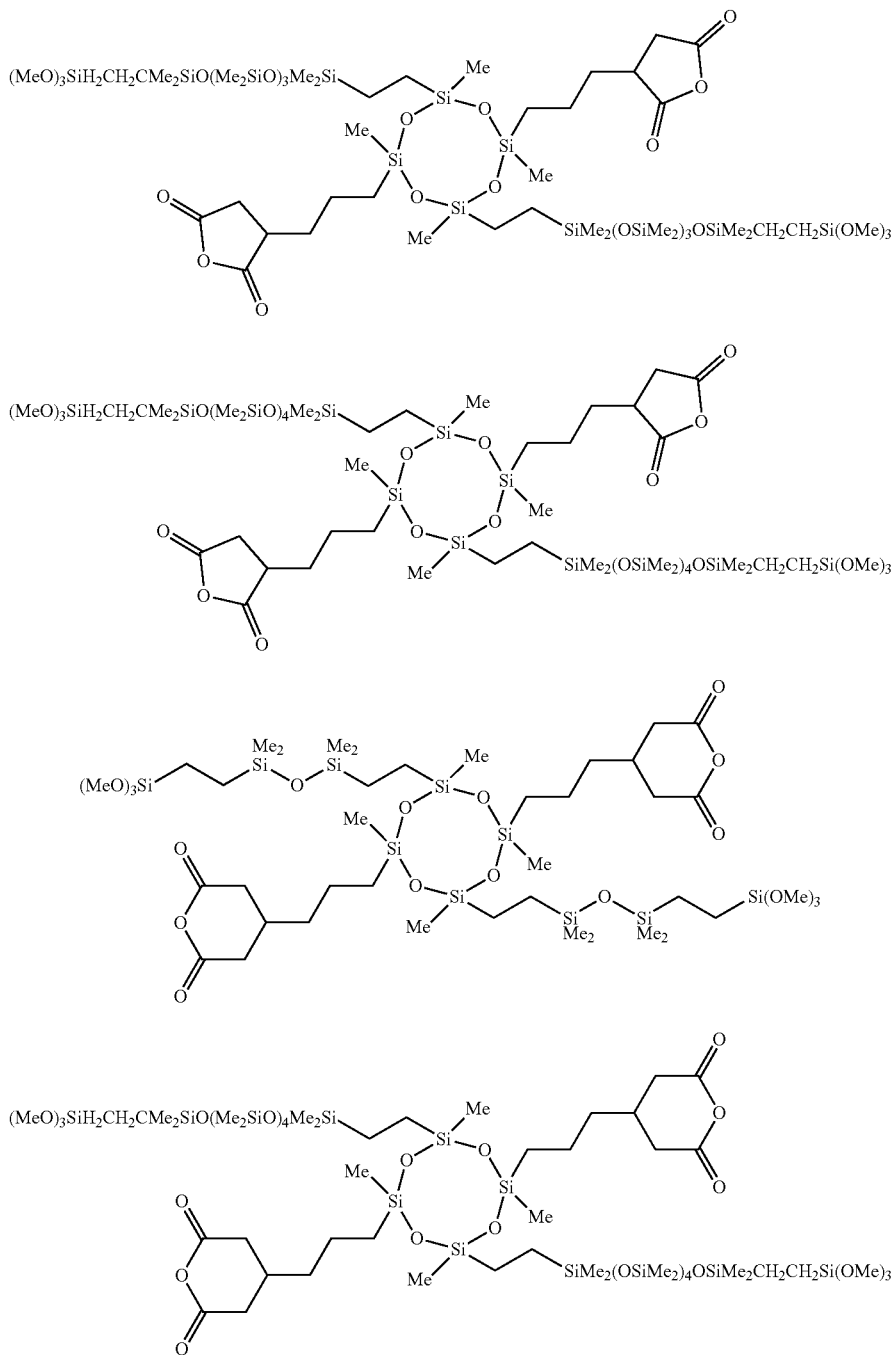

Though the amount used of the dicarboxylic anhydride represented by general formulas (4) and (5) is not particularly limited, it is preferably $0<Y/X\leq3$, more preferably $0<Y/X\leq2$, and even more preferably $0<Y/X\leq1$, from the viewpoint of water repellency, when the bissilylamino group in the bissilylamino group-containing organic polysilazane compound is X and the number of moles of the acid anhydride in the dicarboxylic anhydride is Y.

The composition can contain one or more other additives selected from a pigment, an antifoaming agent, a lubricant, a preservative, a pH adjuster, a film forming agent, an antistatic agent, an antibacterial agent, a dye and the like as long as the effect is not impaired.

When a cured product is obtained by curing the composition, the solvent can be volatilized in advance or do not need to be volatilized, or the composition can be cured while volatilizing the solvent.

The composition can usually be cured by the reaction with moisture in the air, and the curing can be performed under from room temperature to heating temperature. The curing temperature is not particularly limited as long as it does not adversely affect the substrate, and it is preferably 0 to 200° C., more preferably 0 to 100° C., even more preferably 25 to 50° C., from the viewpoint of the influence of oxidation on the physical properties or the curing rate.

A process for forming a coating with the cured product is described below.

Examples of the coating forming method using the composition include a method in which the composition is coated on the surface of an object on which a coating is formed and then cured by reaction with moisture in the air.

The object on which a coating is formed can be an inorganic material or an organic material. Examples of the inorganic material include metals, glass, silica, alumina, talc, calcium carbonate, ceramics, carbon, clay, and graphite. The shape is not particularly limited, and can be any of plate, fiber, sheet, and powder.

As the glass, commonly used types of glass such as E glass, C glass, and quartz glass can be used. The glass fiber can be an aggregate thereof, and can be, for example, a bundle of glass (filament) fibers having a fiber diameter of 3 to 30 μm, a twine, a fabric and the like.

Examples of the organic material include rubber, cellulose, polyethylene, polypropylene, polyvinyl chloride, urethane, acrylic, polycarbonate, nylon, polybutylene terephthalate, polyethylene terephthalate, acrylonitrile-butadiene-styrene-plastic, melamine, phenol, epoxy, polyimide, diallyl phthalate, unsaturated polyester, furan, polybutadiene rubber, polyisoprene rubber, styrene butadiene rubber, nitrile rubber, epichlorohydrin rubber, neoprene rubber, butyl rubber, polysulfide, and urethane rubber. Similarly to the inorganic material, the shape is not particularly limited, and examples thereof include a plate shape, a fiber shape, a sheet shape, and a powder shape.

As a process for covering the object on which a coating is formed, known coating methods such as brush application method, sponge application method, cloth application method, spray coating method, wire bar method, blade method, roll coating method, dipping method, and spin coating method can be used.

For powder materials such as powder silica, powder alumina, powder talc, and powder calcium carbonate, a mixing method can be employed in which the composition is mixed directly using a mixer or a mill together with the object on which a coating is formed.

The coating of the composition reacts with moisture in the air, is cured quickly, and exhibits excellent water repellency. The water repellency can be determined using the contact angle of water droplets as an index, and the contact angle is preferably 95° or more, more preferably 98° or more when the cured coating is smooth.

EXAMPLES

Hereinafter, though the present invention is specifically described by way of Examples and Comparative Examples, the present invention is not limited to Examples below.

Example 1-1

Synthesis of Polysilazane 1 and Preparation of Composition 1

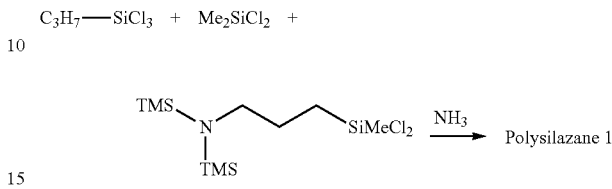

(In formula, Me represents a methyl group, and TMS represents a trimethylsilyl group. The same applies hereinafter.)

The inside of a four-necked glass flask equipped with a stirrer, a gas feed tube, a thermometer, and a reflux condenser is replaced with nitrogen, and 12.7 g (0.0715 mol) of propyltrichlorosilane, 1.9 g (0.0147 mol) of dimethyldichlorosilane, 4.7 g (0.015 mol) of bis(trimethylsilyl)aminopropylmethyldichlorosilane, and 68.8 g of cyclopentylmethyl ether (hereinafter referred to as "CPME") as a solvent were placed and stirred while flowing nitrogen gas to the open end at the top of the reflux condenser to prevent outside air from entering, thereby a homogeneous solution was obtained. While stirring the content at room temperature, ammonia gas was fed into the solution through a feed tube. The ammonia feeding was continued for 3 hours while cooling the content so that the temperature of the content would not exceed 40° C. Then, the ammonia feeding was stopped, and nitrogen gas was flowed in through the feed tube for 1 hour to purge excess ammonia gas.

To this reaction liquid, 23.6 g of a 48% by weight aqueous sodium hydroxide was slowly added, 47.2 g of water was further added, and the mixture was stirred at room temperature for 1 hour. Then, the resulting product was allowed to stand to remove the lower layer.

To the obtained upper layer, 10.9 g of an isoparaffin solvent (IP solvent 1620, manufactured by Idemitsu Kosan Co., Ltd.) was added, the mixture was concentrated at 100° C./17 kPa for 1 hour, and then further concentrated at 120° C./7 kPa for 1 hour. Then, the obtained reaction liquid was filtered through a 1 μm membrane filter to obtain 18.2 g of a colorless transparent solution.

The non-volatile matter content of this solution was measured with an infrared moisture meter (FD-720, manufactured by Kett Electric Laboratory) under conditions of 105° C./3 hours, and found to be 52% by weight. To this solution, 0.7 g of an isoparaffin solvent was added to adjust the non-volatile matter content to 50% by weight.

The obtained composition was subjected to IR analysis. A peak 1,162 cm$^{-1}$ derived from Si—N—Si and a peak 3,391 cm$^{-1}$ derived from NH were observed.

GPC analysis was performed under the following conditions, the average molecular weight was found to be 920, which supported the production of the desired Polysilazane 1, and the Composition 1 including Polysilazane 1 and an isoparaffin solvent was obtained.

[GPC Conditions]
Instrument: HLC-8420GPC EcoSEC Elite-WS (manufactured by Tosoh Corporation)
Column: GPC KF-G 4A (manufactured by Shodex)
GPC KF-404 HQ (manufactured by Shodex)
GPC KF-402.5 HQ (manufactured by Shodex)
Eluant: tetrahydrofuran (THF)
Flow rate: 0.35 mL/min
Detector: RI
Column thermostat temperature: 40° C.
Reference material: polystyrene Example 1-2

Synthesis of Polysilazane 2 and Preparation of Composition 2

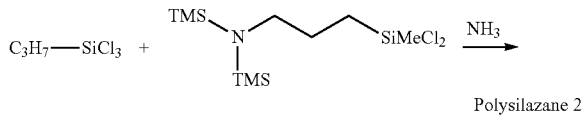

Polysilazane 2

The same procedures as in Example 1-1 was performed except that the raw materials placed in the flask were changed to 24.9 g (0.140 mol) of propyltrichlorosilane, 19.0 g (0.0600 mol) of bis(trimethylsilyl)aminopropylmethyldichlorosilane, and 61.0 g of CPME, the amount of the 48% by weight aqueous sodium hydroxide used for aftertreatment was changed to 47.3 g, the amount of water was changed to 97.4 g, and the amount of the isoparaffin solvent added after the liquid separation was changed to 20.0 g. A solution (34.5 g) having a non-volatile matter content of 54% by weight at 105° C./3 hours was obtained. An isoparaffin solvent (2.8 g) was added to adjust the non-volatile matter content to 50% by weight.

The obtained composition was subjected to IR analysis. A peak 1,181 cm$^{-1}$ derived from Si—N—Si and a peak 3,391 cm$^{-1}$ derived from NH were observed. GPC analysis was performed, the number average molecular weight was found to be 948, which supported the production of the desired Polysilazane 2, and the Composition 2 including Polysilazane 2 and an isoparaffin solvent was obtained.

Example 1-3

Synthesis of Polysilazane 3 and Preparation of Composition 3

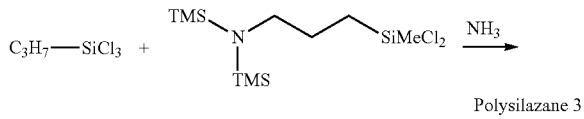

Polysilazane 3

The same procedures as in Example 1-1 was performed except that the raw materials placed in the flask were changed to 24.9 g (0.140 mol) of propyltrichlorosilane, 19.0 g (0.0600 mol) of bis(trimethylsilyl)aminopropylmethyldichlorosilane, and 61.0 g of CPME, the amount of the 48% by weight aqueous sodium hydroxide used for aftertreatment was changed to 47.3 g, the amount of water was changed to 97.4 g, and the isoparaffin solvent added after the liquid separation was changed to 29.0 g of dipropylene glycol dimethyl ether (hereinafter referred to as DPGDME). A solution (47.8 g) having a non-volatile matter content of 50% by weight at 105° C./3 hours was obtained.

The obtained composition was subjected to IR analysis. A peak 1,155 cm$^{-1}$ derived from Si—N—Si and a peak 3,386 cm$^{-1}$ derived from NH were observed. GPC analysis was performed, the number average molecular weight was found to be 864, which supported the production of the Polysilazane 3, and the Composition 3 including Polysilazane 3 and DPGDME was obtained.

The result of $^{29}$Si-NMR (deuterated chloroform solvent) of the composition confirmed that bissilylamino groups remained. The $^{29}$Si-NMR spectrum is shown in FIG. 1.

Example 1-4

Synthesis of Polysilazane 4 and Preparation of Composition 4

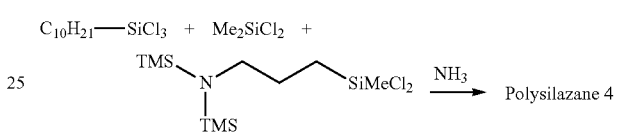

Polysilazane 4

The same procedures as in Example 1-1 was performed except that the raw materials placed in the flask were changed to 30.9 g (0.112 mol) of decyltrichlorosilane, 3.1 g (0.024 mol) of dimethyldichlorosilane, and 7.6 g (0.024 mol) of bis(trimethylsilyl)aminopropylmethyldichlorosilane, and 109.7 g of CPME, the amount of the 48% by weight aqueous sodium hydroxide used for aftertreatment was changed to 37.8 g, the amount of water was changed to 75.8 g, and the amount of the isoparaffin solvent added after the liquid separation was changed to 29.5 g. A solution (44.4 g) having a non-volatile matter content of 58% by weight at 105° C./3 hours was obtained. An isoparaffin solvent (6.7 g) was added to adjust the non-volatile matter content to 50% by weight.

The obtained composition was subjected to IR analysis. A peak 1,169 cm$^{-1}$ derived from Si—N—Si and a peak 3,390 cm$^{-1}$ derived from NH were observed. GPC analysis was performed, the number average molecular weight was found to be 1,332, which supported the production of the desired Polysilazane 4, and the Composition 4 including Polysilazane 4 and an isoparaffin solvent was obtained.

Example 1-5

Synthesis of Polysilazane 5 and Preparation of Composition 5

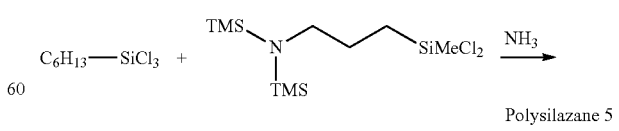

Polysilazane 5

The same procedures as in Example 1-1 was performed except that the raw materials placed in the flask were changed to 19.8 g (0.0902 mol) of hexyltrichlorosilane, 9.5 g (0.0300 mol) of bis(trimethylsilyl)aminopropylmethyldichlorosilane, and 86.0 g of CPME, the amount of the 48% by weight aqueous sodium hydroxide used for aftertreatment was changed to 27.5 g, the amount of water was changed to 56.7 g, and the amount of the isoparaffin solvent added after the liquid separation was changed to 20.0 g. A solution (29.3 g) having a non-volatile matter content of 51% by weight at 105° C./3 hours was obtained. Isoparaffin solvent (IP solvent 1620, manufactured by Idemitsu Kosan Co., Ltd.) (0.6 g) was added to adjust the non-volatile matter content to 50% by weight.

The obtained composition was subjected to IR analysis. A peak 1,185 $cm^{-1}$ derived from Si—N—Si and a peak 3,389 $cm^{-1}$ derived from NH were observed. GPC analysis was performed, the number average molecular weight was found to be 1,186, which supported the production of the desired Polysilazane 5, and the Composition 5 including Polysilazane 5 and an isoparaffin solvent was obtained.

Figure 2:
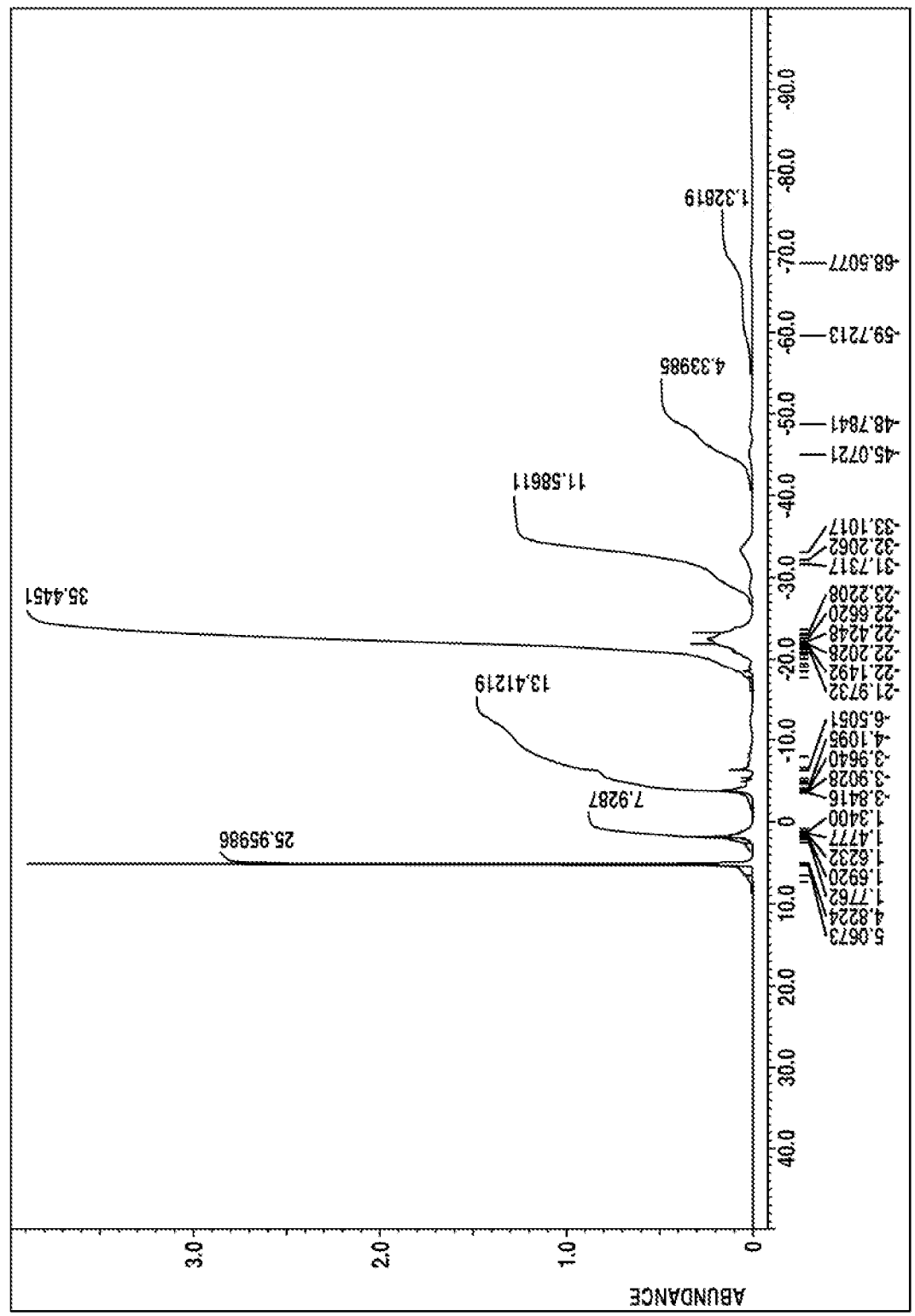
FIG. 2 is a $^{29}$Si-NMR spectrum of the composition obtained in Example 1-5.

The result of $^{29}$Si-NMR (deuterated chloroform solvent) of the composition confirmed that bissilylamino groups remained. The $^{29}$Si-NMR spectrum is shown in FIG. 2.

Example 1-6

Synthesis of Polysilazane 6 and Preparation of Composition 6

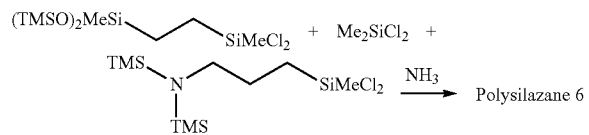

The same procedures as in Example 1-1 was performed except that the raw materials placed in the flask were changed to 43.0 g (0.112 mol) of 1-bis(trimethylsiloxy)methylsilyl-2-trichlorosilylethane, 3.1 g (0.024 mol) of dimethyldichlorosilane, and 7.6 g (0.024 mol) of bis(trimethylsilyl)aminopropylmethyldichlorosilane, and 111.8 g of CPME, the 48% by weight aqueous sodium hydroxide used for aftertreatment was changed to 72.6 g of 25% by weight aqueous sodium hydroxide, the amount of water was changed to 34.8 g, and the isoparaffin solvent added after the liquid separation was changed to 41.7 g of tris(trimethylsiloxy)methylsilane. A solution (41.5 g) having a non-volatile matter content of 49% by weight at 105° C./3 hours was obtained. Tris(trimethylsiloxy)methylsilane (9.0 g) was added to adjust the non-volatile matter content to 40% by weight.

The obtained composition was subjected to IR analysis. A peak 1,170 $cm^{-1}$ derived from Si—N—Si and a peak 3,393 $cm^{-1}$ derived from NH were observed. GPC analysis was performed, the number average molecular weight was found to be 1,186, which supported the production of the desired Polysilazane 6, and the Composition 6 including Polysilazane 6 and an isoparaffin solvent was obtained.

Examples 2-1 to 2-8, Comparative Examples 2-1 and 2-2

Evaluation of Curability and Water Repellency

Each of Compositions 1 to 5 including the polysilazane obtained above and the organic polysilazanes of Comparative Examples were mixed with other components at the ratios shown in Table 5 below with being careful to prevent moisture from entering to prepare compositions.

The prepared compositions were applied on a polished steel plate (10×15 cm) with a bar coater to a wet thickness of 30 μm, and cured at 25° C. and 50% relative humidity. The tacky dry time (tack-free time) at that time was measured and evaluated as follows.
[Evaluation Criteria]
AA: The composition reaches tack-free within 15 minutes
A: The composition reaches tack-free in 15 to 30 minutes
B: The composition reaches tack-free in 30 to 60 minutes
C: The composition reaches tack-free in more than 60 minutes In some Examples, the water contact angle (2 μL) of the obtained coating was measured with a contact angle meter (manufactured by Kyowa Interface Science Co., Ltd.) and evaluated as follows.
[Evaluation Criteria]
A: Contact angle of 101° or more
B: Contact angle of 95 to less than 101°
C: Contact angle of less than 95°

Further, to determine the stability of the composition, the heat generation during mixing was also checked and evaluated as follows.
[Evaluation Criteria]
A: No heat is generated during mixing
C: Heat is generated during mixing

TABLE 5

| Component | (% by weight) | Example 2-1 | 2-2 | 2-3 | 2-4 | 2-5 | 2-6 | 2-7 | 2-8 | Comparative Example 2-1 | 2-2 |
|---|---|---|---|---|---|---|---|---|---|---|---|
| Polysilazane composition or polysilazane | Polysilazane composition 1 | 44 | | | | | | | | | |
| | Polysilazane composition 2 | | 16 | | | | | | | | |
| | Polysilazane composition 3 | | | 33 | 28 | 33 | | | | | |
| | Polysilazane composition 4 | | | | | | 17 | | | | |
| | Polysilazane composition 5 | | | | | | | 30 | 30 | | |
| | Organic polysilazane | | | | | | | | | 20 | 18 |
| Dicarboxylic anhydride | Dicarboxylic anhydride 1 | 6 | 4 | 4 | 6 | 4 | 3 | 5 | 5 | | 2 |
| | Dicarboxylic anhydride 2 | | | | | | | | | | |
| Solvent | DPGDME | 50 | 80 | 64 | 66 | 64 | 80 | 65 | 65 | 60 | 62 |
| | IP solvent 1620 | | | | | | | | | 20 | 18 |
| Curing catalyst | Titanium tetra-n-butoxide | 1 | 1 | 1 | 1 | | 1 | 1 | | | |
| Evaluation | Tack-free time (minute) | A | A | A | AA | A | AA | A | B | A | AA |
| | Water contact angle (°) | A | B | A | A | A | A | B | B | C | C |
| | Heat generation during mixing | A | A | A | A | A | A | A | A | A | C |

The components described in Table 5 are shown below.
Dicarboxylic anhydride 1: 3-trimethoxysilylpropyl succinic anhydride (X-12-967C (manufactured by Shin-Etsu Chemical Co., Ltd.))
Dicarboxylic anhydride 2: mixture of 1,3-bis(propyl succinic anhydride)-5,7-bis(trimethoxysilyloctyl)-tetramethylcyclotetrasiloxane and 1,5-bis(propyl succinic anhydride)-3,7-bis(trimethoxysilyloctyl)-tetramethylcyclotetrasiloxane
DPGDME: dipropylene glycol dimethyl ether (manufactured by Tokyo Chemical Industry Co., Ltd.)
Curing catalyst: titanium tetra-n-butoxide (manufactured by Tokyo Chemical Industry Co., Ltd.)
Organic polysilazane: HTA-1500RC (manufactured by SANWA KAGAKU CORP.)

The compositions including the bissilylamino group-containing organic polysilazane in Examples generated no heat when they were mixed with an acid anhydride to prepare a one-pack type composition, and thus were found to be stable compositions. It was also found that both curability and water repellency were achieved by mixing the compositions with a dicarboxylic anhydride.

On the other hand, the results of Comparative Examples show that amino group-containing organic polysilazanes form a cured coating quickly, but have low water repellency. The results also show that when the composition including an amino group-containing organic polysilazane and a solvent is mixed with an acid anhydride, heat is generated during mixing, showing low stability of the composition as a one-pack type composition. Further, the results also show that the compositions form a cured coating quickly, but the water repellency of the cured coating is low.

Japanese Patent Application No. 2019-078714 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A bissilylamino group-containing organic polysilazane compound having an average composition represented by general formula (1) below:

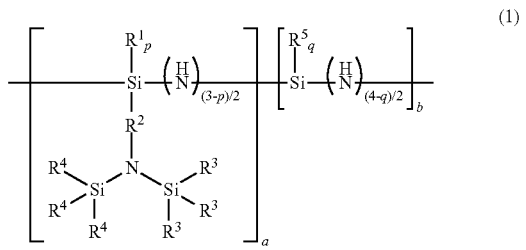

wherein $R^1$ is each independently a monovalent hydrocarbon group having 1 to 10 carbon atoms, $R^2$ is each independently a divalent hydrocarbon group having 1 to 20 carbon atoms optionally containing a heteroatom of O, S, or Si, $R^3$ and $R^4$ are each independently a monovalent hydrocarbon group having 1 to 10 carbon atoms, $R^3$ and $R^4$ optionally bond each other to form a ring structure together with a silicon atom to which $R^3$ and $R^4$ are bonded and a nitrogen atom to which the silicon atom is directly bonded, $R^5$ is each independently a substituted or unsubstituted monovalent hydrocarbon group having 1 to 50 carbon atoms optionally containing a heteroatom of O or S, p is 0 or 1, q is 0, 1, or 2, and a and b are numbers which satisfy $0<a\le1$, $0\le b<1$, and $a+b=1$, and having a number average molecular weight in terms of polystyrene measured by gel permeation chromatography of 500 to 100,000.

2. A method for producing the bissilylamino group-containing organic polysilazane compound according to claim 1, comprising the step of:
mixing a chlorosilane compound having a bissilylamino group represented by general formula (2) below:

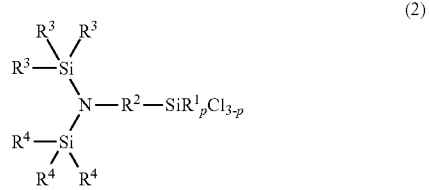

wherein $R^1$ to $R^4$ and p have the same meaning as above,
and a chlorosilane compound represented by general formula (3) below as needed:

wherein $R^5$ and q have the same meaning as above,
and conducting an ammonolysis polymerization.

3. The method for producing a bissilylamino group-containing organic polysilazane compound according to claim 2, further comprising the step of adding an aqueous alkali solution for liquid separation after the ammonolysis polymerization.

4. A composition comprising the bissilylamino group-containing organic polysilazane compound according to claim 1 and a solvent.

5. The composition according to claim 4, further comprising a dicarboxylic anhydride represented by general formula (4) below, or a siloxane-containing dicarboxylic anhydride represented by general formula (5) below:

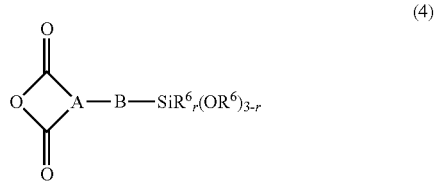

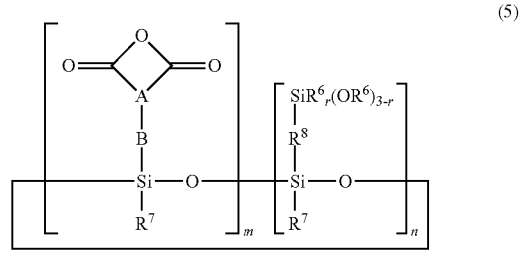

wherein A is a trivalent hydrocarbon group having 2 to 10 carbon atoms, B is a single bond or a divalent hydrocarbon group having 1 to 10 carbon atoms optionally containing a heteroatom of N, O, or S, $R^6$ is each independently a monovalent hydrocarbon group having 1 to 10 carbon atoms, $R^7$ is each independently a monovalent hydrocarbon group having 1 to 10 carbon atoms, $R^8$ is each independently a divalent hydrocarbon group having 1 to 20 carbon atoms, or a siloxane-containing group represented by general formula (6) below:

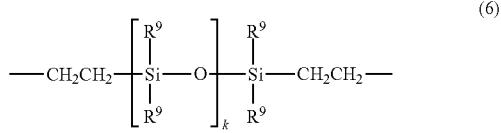

(6)

wherein $R^9$ is each independently a monovalent hydrocarbon group having 1 to 10 carbon atoms, and k is an integer of 1 to 10, r is 0, 1, or 2, and m and n are integers which satisfy $m \geq 1$, $n \geq 1$, and $3 \leq m+n \leq 8$.

6. The composition according to claim 4, further comprising at least one metal compound selected from the group consisting of a titanium compound, an aluminum compound, a zinc compound, and a tin compound.

7. A cured product of the composition according to claim 5.

8. The composition according to claim 5, further comprising at least one metal compound selected from the group consisting of a titanium compound, an aluminum compound, a zinc compound, and a tin compound.

\* \* \* \* \*